May 8, 1934.  R. BROUSSEAU  1,957,690
WHEEL RIM
Filed Nov. 18, 1932   2 Sheets-Sheet 1
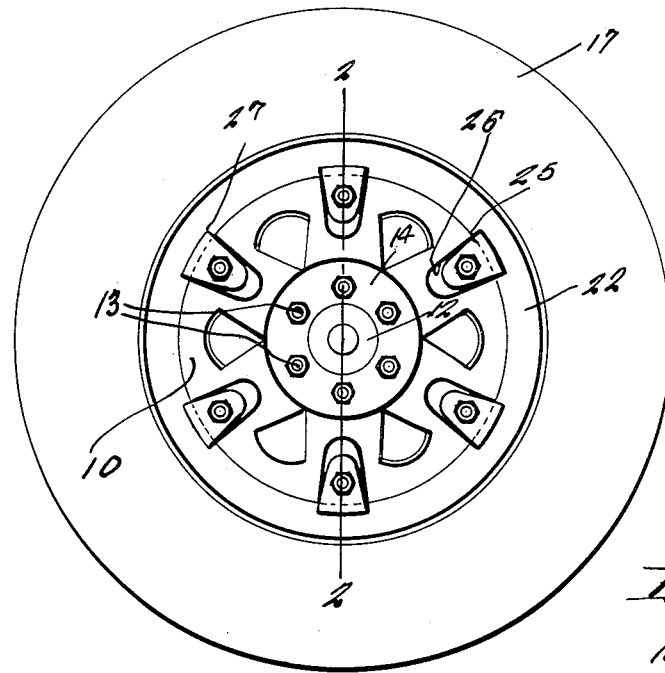
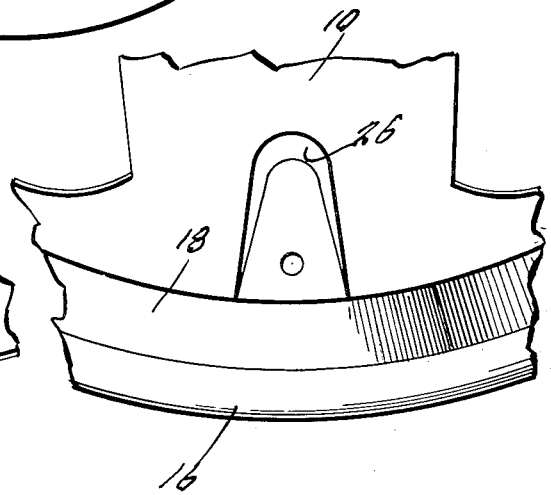
Inventor
Rene Brousseau
By Clarence A. O'Brien
Attorney

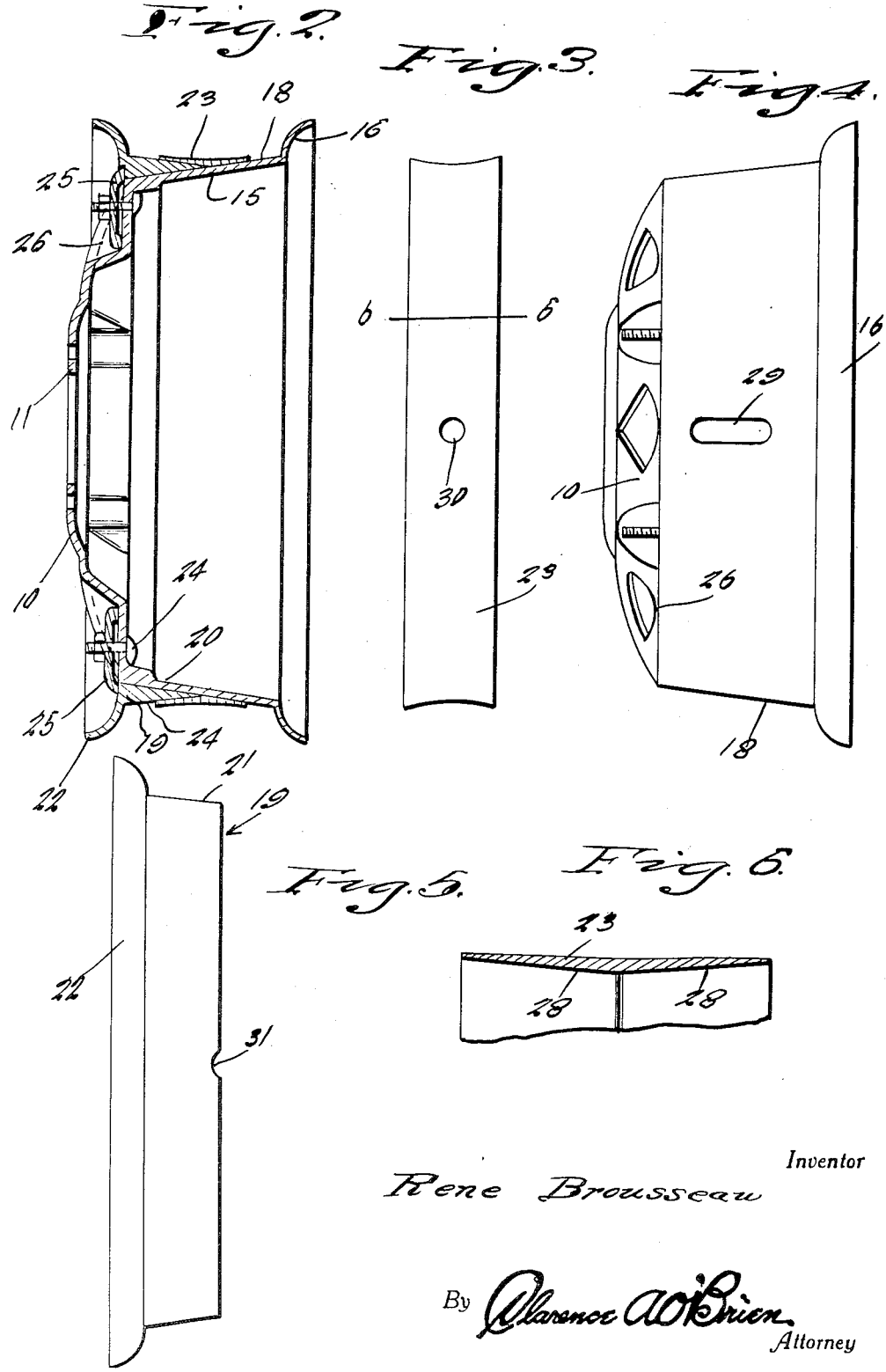

Patented May 8, 1934

1,957,690

UNITED STATES PATENT OFFICE 1,957,690

WHEEL RIM

René Brousseau, Forestville, Conn., assignor of one-half to Frank Paradis, Bristol, Conn.

Application November 18, 1932, Serial No. 643,254

1 Claim. (Cl. 152—21)

This invention relates to wheels and rims therefor and has more particular reference to a disk wheel.

The object of the invention is to provide an improved disk wheel and rim therefore which will permit of easy removal of a tire even after the same has been on the wheel for a considerable period of time.

A still further object of the invention is to provide a wheel rim of the character mentioned which will require, for the removal of a tire therefrom, no other tool than the usual wheel wrench.

The invention together with its numerous objects and advantages will be best understood from a study of the following description taken in connection with the accompanying drawings wherein:

Figure 1 is an elevational view of the outboard side of a wheel embodying the features of the present invention.

Figure 2 is a sectional view taken substantially on the line 2—2 of Figure 1.

Figure 3 is a plan view of a hoop forming part of the invention.

Figure 4 is a plan view of the wheel disk.

Figure 5 is a plan view of the outer rim element.

Figure 6 is a sectional view taken substantially on the line 6—6 of Figure 3.

Figure 7 is a fragmentary side elevational view of the outer rim element, and

Figure 8 is a fragmentary side elevational view of the wheel disk shown in Figure 4.

Referring more in detail to the drawings it will be seen that the wheel and rim comprise a disk 10 provided at 11 for receiving the hub 12, and being suitably apertured for receiving the bolts 13 employed for securing the wheel disk to the flange 14 of the hub.

Stamped integral with the disk 10 is an inner rim element 15 which at its inner edge is provided with an annular flange or bead 16 adapted for disposition against the outer side of the inner flange or bead of the tire casing 17. The rim element 15 is provided with an outer peripheral inclined surface 18.

An outer rim element 19 is adapted to telescope on to the rim element 15 and is provided with inclined inner and outer peripheral surfaces 20, 21. At its outboard edge the rim element 19 is provided with an annular flange or bead 22 that is adapted to lie against the outer side of the outer bead of the casing 17 as is apparent.

From a study of Figure 2 it will be noted that the inclined surfaces 18 and 21 meet in the center in such a manner that when the rim sections 15 and 19 are assembled together a groove, substantially V-shaped in cross section is provided around the periphery of the wheel.

Before the casing 17 is placed between the beads 16 and 22, a hoop member 23 is positioned so that the beads of the tire casing rest on the outer periphery of the hoop. The hoop 23 is then placed on the rim element 18 after which the rim element 19 is assembled and as the sections or elements 18 and 19 are moved toward one another by the tightening of the bolts 24 the hoop 23 slides up the inclined surfaces 18, 21 of the rim elements or sections, forcing the beads of the tire casing into suitable engagement with the flanges 16, 22.

For securing the rim member 19 in position there is provided for each of the bolts 24 a retaining lug 25, and to accommodate the lugs 25 the disk 10 is provided with sockets 26 while the rim element 19 is provided with a circular series of notches 27 to aline with the sockets 26 to accommodate one end portion of the lugs 25 in the manner suggested in Figure 2.

To secure hoop member 23 in wedged position, the latter has inner circumferential face provided with oppositely inclined faces 28 to engage the inclined peripheral faces 18, 21, as shown in Figure 2.

To accommodate the tire valve stem, flange or inner rim section 15 is provided with a transverse slot 29; hoop 23 is provided with an aperture 30 to register with the slot 29, and outer rim section 19 at its inboard edge is notched as at 31.

Even though I have herein shown and described the preferred embodiment of the invention, it is to be understood that the same is susceptible of further changes, modifications and improvements coming within the scope of the appended claim.

Having thus described my invention, what I claim as new is:

In a wheel, a disk forming the web of the wheel and having an integral frusto-conical rim flange turned thereon, a demountable rim section including an annular part, wedge-shaped in cross section, and fitting said rim flange, and a continuous hoop surrounding said rim flange and demountable rim section and having oppositely inclined interior surfaces engaging the exterior surfaces of the rim flange and demountable rim section and an exterior circumferential concave surface.

RENÉ BROUSSEAU.